July 28, 1936.　　　A. A. EWALD　　　2,048,855
FAUCET
Filed March 14, 1935　　　2 Sheets-Sheet 1
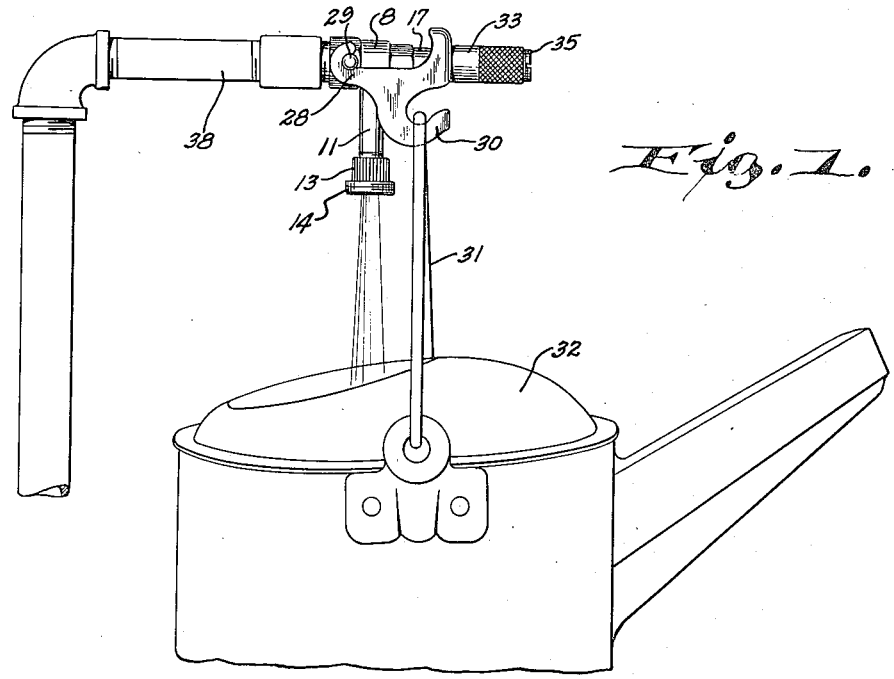
Fig. 1.
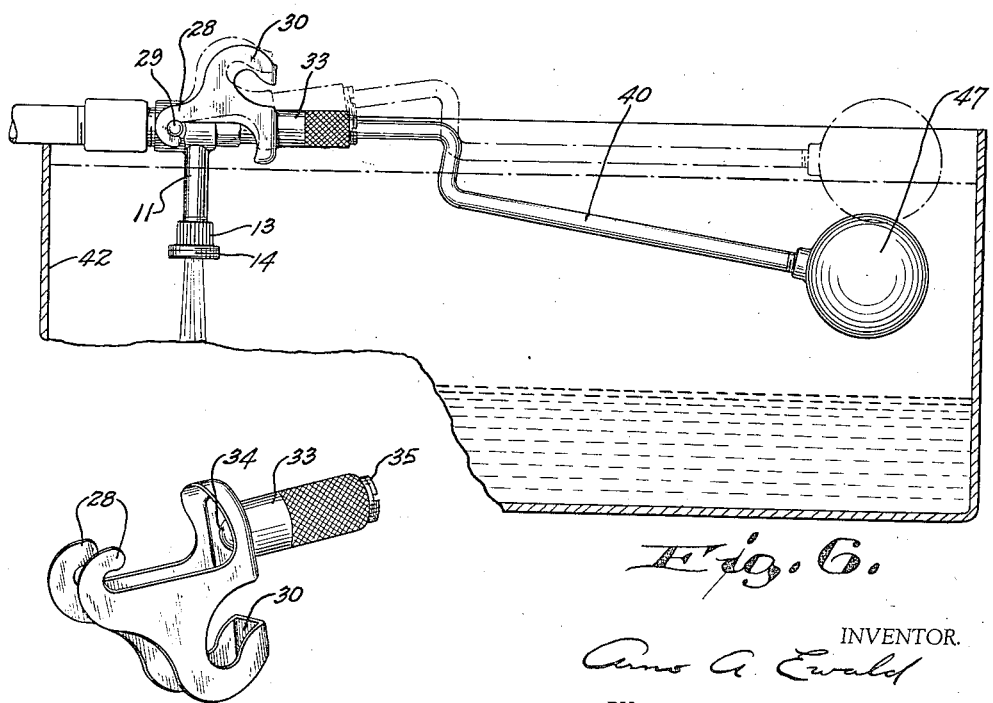
Fig. 6.
Fig. 5.
INVENTOR.
Arno A. Ewald
BY
Morrell Lieber & Morrell
ATTORNEYS.

July 28, 1936.  A. A. EWALD  2,048,855
FAUCET
Filed March 14, 1935   2 Sheets—Sheet 2
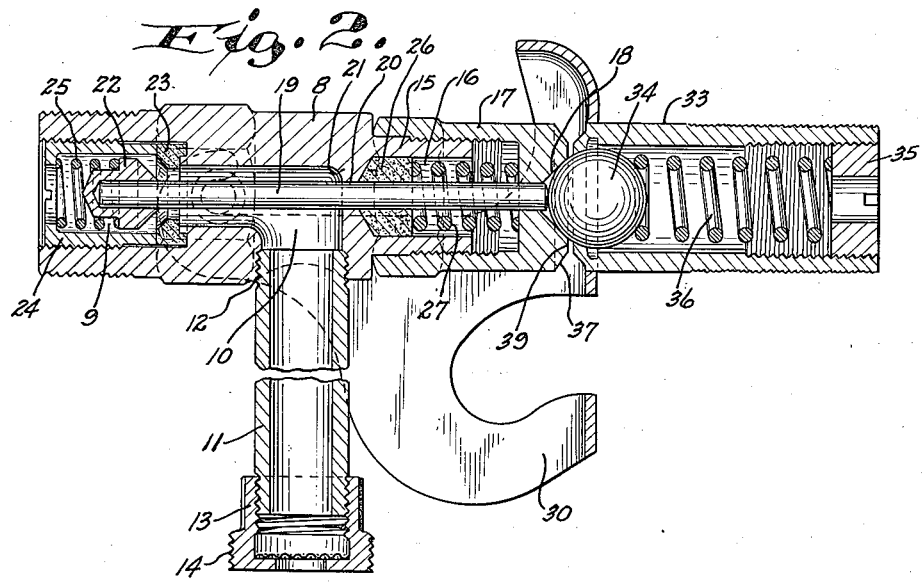
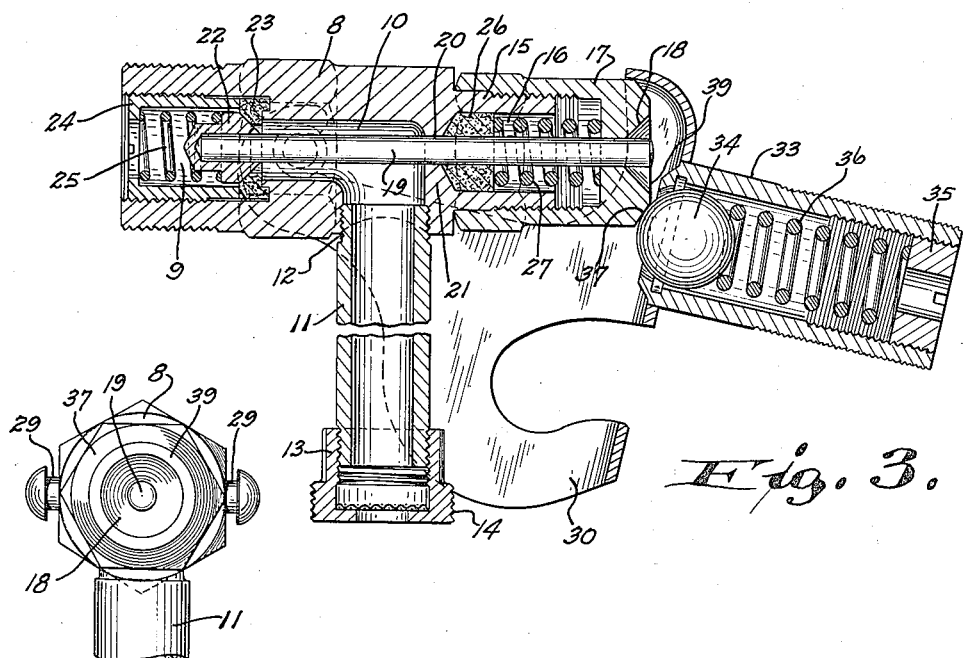
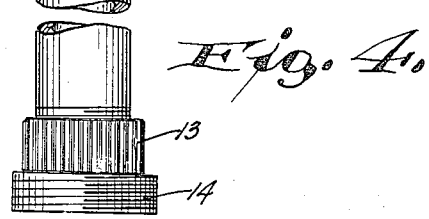
INVENTOR.
Arno A. Ewald
BY
Morsell Kieber & Morsell
ATTORNEYS.

Patented July 28, 1936

2,048,855

UNITED STATES PATENT OFFICE 2,048,855

FAUCET

Arno A. Ewald, Oakfield, Wis., assignor to Romort Manufacturing Company, Oakfield, Wis., a corporation of Wisconsin Application March 14, 1935, Serial No. 10,977

8 Claims. (Cl. 251—116)

This invention relates to improvements in faucets.

Among other good-will services which attendants at gasoline stations are required to render is the checking of radiators and the filling thereof with water. It is common practice to keep on hand one or more water buckets. These buckets must be kept filled and ready for use. During rush periods the attendants are so busy dispensing gasoline and rendering other services that the buckets frequently become empty. The filling thereof under these circumstances consumes a substantial amount of valuable time due to the fact that the ordinary faucet must be watched during the entire filling procedure so that it can be shut off at the proper moment. This necessity for the filling of buckets therefore slows up the service rendered and often causes other customers, who are usually impatient, to wait for attention. Inasmuch as motorists are almost unreasonable in their demand for quick service, delays may result in the loss of a customer.

It is one of the objects of the present invention to provide a faucet having a valve operating member so designed that the bail of a water bucket may be suspended therefrom, the construction being such that the water will be automatically shut off when a predetermined amount has been discharged into the bucket.

A further object of the invention is to provide a faucet as above described having adjustable means for regulating the amount of water required to effect shutting off of the valve.

A further object of the invention is to provide a device as above described wherein the valve control member is separable from the valve and faucet structure proper by a simple manual movement to thereby lock the faucet against tampering and surreptitious use.

A further object of the invention is to provide a valve structure for faucets and hose connections capable of use in various types of installations in place of the ordinary key or hand wheel operated valve, the novel removable control member making it particularly suitable for household hose connections in that it can be manipulated by a simple movement of the hand and in that when the control member is removed the water cannot be turned on by children or by others who might have one of the standard types of hose connection keys.

A further object of the invention is to provide a valve structure capable of use in connection with a suitable float to automatically control the liquid level in a tank.

Other objects of the invention are to provide a faucet having a yieldingly slidable valve rod wherein the rod is actuated by the engagement of a spring tensioned ball with the end thereof; to provide an automatic valve structure which will function properly at any desired water pressure; to provide a valve structure having a packing arrangement including an automatic take-up; and to provide a valve structure wherein the valve is so arranged and formed as to eliminate the possibility of its being prematurely urged to closing position because of high water pressure.

With the above and other objects in view, the invention consists of the improved faucet and all its parts and combinations as set forth in the claims, and all equivalents thereof.

In the accompanying drawings in which the same reference numerals designate the same parts in all of the views:

Fig. 1 is a side elevational view of the improved faucet showing a water bucket operatively associated therewith, parts being broken away;

Fig. 2 is a longitudinal vertical sectional view through the improved device showing the parts in valve opening position;

Fig. 3 is a similar view showing the parts in valve closing position;

Fig. 4 is an outer end view of the device with the valve operating member removed;

Fig. 5 is a perspective view of the valve operating member alone; and

Fig. 6 is a vertical sectional view through a tank showing the improved valve structure modified for use in connection with a liquid level controlling float.

Referring more particularly to the drawings, the numeral 8 designates the main body portion of the device and said body has a bore or valve chamber 9 extending into one end thereof, there being an L-shaped passageway 10 communicating with the inner end of the bore. A tubular faucet discharge member 11 is threaded into the main body as at 12 in communication with the L-shaped passageway 10. The lower end of the faucet discharge member may have a connection member 13 fitted on its lower end, said connection member having external threading 14 for the reception of a hose coupling or the like.

The other end of the body 8 opposite the bore 9 has an extension 15 of reduced diameter within which a bore or packing chamber 16 is formed. A cap member 17 is threaded on the extension 15 and the outer end of said cap member has a central substantially conical recess as at 18. A valve rod 19 extends slidably through the recessed end 18 of the cap 17, through the bore 16, through an aperture 20 in a partition 21, through a portion of the L-shaped passageway 10, and into the bore or valve chamber 9 at the inner end of the main body. In said bore, fixed to said end of the valve rod, is a valve member 22 which is adapted to cooperate with a valve seat 23 of rubber or the like. A cylindrical plug 24 is threaded into the bore 9 and is adapted to act upon a coiled spring 25 within the bore and engaging the valve member 22 to adjust the tension upon said valve member. It is to be noted that the valve member 22 is of less diameter than the valve seat 23. With this arrangement water flowing through the device will not act unduly upon the valve member in a closing direction but instead will pass around the valve member. If the valve member were of the same or greater diameter than the seat 23 which is conventional practice, water of high pressure would act upon the valve to urge it in a closing direction and might cause premature closing thereof.

Within the chamber 16 and closely surrounding the valve rod 19 is packing material 26. A coiled spring 27 surrounding the valve rod constantly maintains the packing 26 against the inner end of the bore 16 to thereby provide an automatic take-up. This does away with the necessity for utilizing a packing nut which must be frequently tightened to prevent leaks through or around the packing.

The valve operating member which cooperates with the main body is shown alone in Fig. 5. This member comprises a pair of spaced hooks 28 engageable with rivets 29 which extend laterally from the exterior of the main body as shown in Fig. 4. The hook forming portions of the valve operating member extend downwardly to provide a lower hook 30 for supporting the bail 31 of a container or the like 32 as shown in Fig. 1. Rigidly secured to the outer portion of the hook forming parts heretofore described, is a tubular member 33 forming a handle. Projecting from the inner end of the bore of said tubular member is a ball 34, the said inner end being of less diameter than the ball so that the ball cannot escape from the bore. An adjustment plug 35 threaded in the outer end of the handle operates to urge a spring 36 into engagement with the ball 34 to cause the ball to partially project through the inner end of the handle member and into the recess 18 of the cap 17 on the main body when the parts are in the position shown in Fig. 2.

In use, a bucket may be suspended from the hook 30 and the handle 33 moved upwardly from the position of Fig. 3 to the position of Figs. 1 and 2. This movement can be readily accomplished by a quick jerk of the hand. When the handle is moved to this position the ball rides from the beveled peripheral portion 37 of the cap 17 into the recess 18, and due to the fact that the spring 36 is of much greater strength than the spring 25 within the valve chamber, pushes upon the outer end of the valve rod 19 to move said end from the position shown in Fig. 3 to the position shown in Fig. 2. This causes opening movement of the valve 22 from the position of Fig. 3 to the position of Fig. 2 against the tension of the spring 25 and permits water to flow from a conduit 38 connected with a source of supply, through the valve chamber 9, through the L-shaped chamber 10, and out of the spout 11 into the bucket 32. When the bucket has been filled the weight of the water therein will be sufficient, when acting in a downward direction upon the hook 30, to pull the ball 34 over the peripheral shoulder 39 and into engagement with the peripheral bevel 37. In other words, the ball will be moved out of the recess 18 from the position of Fig. 2 to the position of Fig. 3. The spring 25 acting against the valve member 22 will immediately close the valve to prevent further flow of water. With this arrangement a gasoline station attendant can hang an empty bucket on the improved faucet, jerk the handle 33 to "on" position and then go about his other duties without watching the flow of water, knowing that the faucet will be automatically turned off when the bucket is full. Thus, by the time he again has a demand for water, there will be a full bucket waiting for him on the hook.

By means of the plug 35 acting on the spring 36 the device may be readily adjusted to regulate the amount of water required to effect shutting-off of the valve.

If it is not desired to use the device for filling buckets, a hose may be easily connected to the connection member 13 and the handle 33 pulled upwardly to turn on the water and downwardly to shut off the water. These movements can be quickly accomplished and render the device an improvement over the usual type of hose connection valve wherein a hand wheel or key must be turned.

At night or at other times when it is desired to lock the faucet the handle 33 and associated hooks may be quickly removed by pulling upwardly from the position of Fig. 2. This permits disengagement of the hooks from the rivets 29. The handle member may then be taken indoors and this obviously prevents further use of the faucet until the handle is re-attached. This is a great convenience for gasoline stations as it enables them to quickly lock the faucets at night. This detachable feature also makes the faucet particularly suitable for household hose connections in place of the ordinary key or hand wheel operated valve, as it enables the user to easily detach the handle and take it indoors when he has finished using his hose. Thus the faucet is locked against tampering and surreptitious use. With the ordinary key operated hose connection valve so many people have the standard type of key that there is no way of being sure that the faucet is not being used by an unauthorized person.

The device is obviously capable of other adaptations. One of these adaptations is illustrated in Fig. 6 wherein the handle member is reversed in position and has a rod 40 projecting therefrom having a float 41 on its outer end. With this arrangement the float can be made of sufficient weight to force the handle member downwardly into valve opening position to thereby turn on the water flowing into a tank 42. When the water reaches the desired level in the tank the float will be moved upwardly from the full line position of Fig. 6 to the dotted line position to thereby shut off the flow of water. When so used, means should be provided to prevent the handle from moving to the lower shut off position as when the float is not acted upon by water, gravity should always urge the handle portion 33 to the valve opening position and not to the lower shut off position of Fig. 3. Thus the liquid level in a tank can be controlled in a very simple and positive manner.

Although only two forms of the invention have been shown and described, it is obvious that various changes and modifications may be made without departing from the spirit of the invention and all of such changes are contemplated as may come within the scope of the claims.

What I claim is:

1. A faucet comprising a main body portion having a spout, a valve for controlling the flow of liquid through said spout, yielding means normally urging said valve to closing position, a slidable valve rod in connection with the valve and having its outer end projecting from the outer end of the main body portion, a valve operating member pivotally connected with the main body, a ball movably mounted in said operating member and having a part engageable with the projecting end of the valve rod to depress the latter when the valve operating member is in one position of movement, and yielding means of greater strength than the yielding means associated with the valve for normally urging said ball in a valve opening direction.

2. A faucet comprising a main body portion having a spout, a valve for controlling the flow of liquid through said spout, yielding means normally urging said valve to closing position, a slidable valve rod in connection with the valve and having its outer end projecting from the outer end of the main body portion, a valve operating member pivotally connected with the main body, a ball movably mounted in said operating member and having a part engageable with the projecting end of the valve rod to depress the latter when the valve operating member is in one position of movement, and adjustable yielding means of greater strength than the yielding means associated with the valve for urging said ball in a valve opening direction.

3. A faucet comprising a main body portion having a recessed outer end portion and having a spout, a valve for controlling the flow of liquid through said spout, yielding means normally urging said valve to closing position, a slidable valve rod in connection with the valve and having its outer end projecting into the recessed outer end portion of the main body, a handle pivotally connected to the main body, and means carried by said handle and cooperable with said recessed outer end of the main body when the handle is in one position of movement to depress the valve rod and to hold the handle in said valve rod depressing position.

4. A faucet comprising a main body portion having a recessed outer end portion and having a spout, a valve for controlling the flow of liquid through said spout, yielding means normally urging said valve to closing position, a slidable valve rod in connection with the valve and having its outer end projecting into the recessed outer end portion of the main body, a handle pivotally connected to the main body, and a tensioned ball carried by said handle and cooperable with said recessed outer end of the main body when the handle is in one position of movement to depress the valve rod and to hold the handle in said valve rod depressing position.

5. A faucet comprising a main body portion having a recessed outer end portion and having a spout, a valve for controlling the flow of liquid through said spout, yielding means normally urging said valve to closing position, a slidable valve rod in connection with the valve and having its outer end projecting into the recessed outer end portion of the main body, a handle pivotally connected to the main body and having a tubular portion open at its inner end and adapted to register with the recessed outer end of the main body, a ball mounted in said tubular portion, and yielding means urging a portion of said ball to project through said open end of the tubular handle portion, said ball being adapted to snap into said recessed end of the main body upon movement of the handle to depress the valve rod.

6. A faucet comprising a main body having an outer end portion formed with a peripheral bevel and with a recess spaced within said peripheral bevel, said main body also having a spout, a valve for controlling the flow of liquid through said spout, yielding means normally urging said valve to closing position, a slidable valve rod in connection with the valve and having its outer end projecting into the recess in the outer end portion of the main body, a handle pivotally connected to the main body, and tensioned means carried by said handle and movable with the handle from a "shut off" position in engagement with the bevel to a position within the recess to depress the valve rod and to hold the handle in said valve rod depressing position.

7. A faucet comprising a main body portion having a spout, a valve for controlling the flow of liquid through said spout, yielding means normally urging said valve to closing position, a slidable valve rod in connection with the valve and having its outer end projecting from the outer end of the main body portion, a valve operating member pivotally connected with the main body, means movably mounted in said operating member and having a part engageable with the projecting end of the valve rod to depress the latter when the valve operating member is in one position of movement, and yielding means of greater strength than the yielding means associated with the valve for normally urging said movably mounted means in a valve opening direction.

8. A faucet comprising a main body portion having a discharge opening, a valve for controlling the flow of liquid through said discharge opening, a valve operating member having a handle portion alineable with the main body portion and projecting outwardly from the outer end thereof and having inwardly extending spaced projections embracing opposite sides of said main body, cooperating means on said projections and on the main body for pivotally connecting the operating member to the main body, said cooperating means being disengageable from one another by movement of the operating member past operating position.

ARNO A. EWALD.